US009328854B2

(12) United States Patent
Seryi et al.

(10) Patent No.: US 9,328,854 B2
(45) Date of Patent: May 3, 2016

(54) SOLDERLESS HOSE CONNECTION FOR A LINE SECTION OF AN AIR CONDITIONING SYSTEM

(71) Applicant: GM GLOBAL TECHNOLOGY OPERATIONS LLC, Detroit, MI (US)

(72) Inventors: Artem Seryi, Wiesbaden (DE); Lothar Seybold, Nauheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 371 days.

(21) Appl. No.: 13/765,420

(22) Filed: Feb. 12, 2013

(65) Prior Publication Data

US 2013/0207384 A1  Aug. 15, 2013

(30) Foreign Application Priority Data

Feb. 15, 2012  (DE) .................. 10 2012 002 994

(51) Int. Cl.
| F16L 33/00 | (2006.01) |
| F28D 7/00 | (2006.01) |
| F16L 33/207 | (2006.01) |
| B60H 1/00 | (2006.01) |

(52) U.S. Cl.
CPC ............ *F16L 33/00* (2013.01); *B60H 1/00571* (2013.01); *F16L 33/207* (2013.01)

(58) Field of Classification Search
CPC .. F16L 33/00; F16L 33/207; Y10T 29/49913; B21D 39/04; B21D 39/048; B21D 27/10
See application file for complete search history.

(56) References Cited

U.S. PATENT DOCUMENTS

| 5,339,668 | A | * | 8/1994 | Manning et al. ................... 72/70 |
| 5,401,064 | A | | 3/1995 | Guest |
| 5,720,325 | A | | 2/1998 | Grantham |
| 6,394,506 | B1 | * | 5/2002 | Street ............................. 285/256 |
| 7,427,084 | B1 | | 9/2008 | Betz |
| 2007/0241560 | A1 | | 10/2007 | Malone |
| 2008/0202157 | A1 | | 8/2008 | Hirota |
| 2010/0326640 | A1 | | 12/2010 | Higashiyama et al. |

FOREIGN PATENT DOCUMENTS

| DE | 20022757 U1 | 2/2002 |
| DE | 102007042841 A1 | 3/2009 |
| FR | 2822922 A1 | 10/2002 |

OTHER PUBLICATIONS

Translation of Germany Patent Publication No. DE102007042841 published on Mar. 12, 2009.*
German Patent Office, German Search Report for Application No. 102012002994.2, dated Mar. 20, 2012.
Great Britain Patent Office, Great Britain Examination Report for Great Britain Application No. 1301927.8, dated Nov. 27, 2015.
Great Britain Patent Office, Great Britain Search Report for Great Britain Application No. 1301927.8, dated Jun. 10, 2013.

* cited by examiner

*Primary Examiner* — David Bryant
*Assistant Examiner* — Jun Yoo
(74) *Attorney, Agent, or Firm* — Ingrassia Fisher & Lorenz PC

(57) ABSTRACT

A method for manufacturing a connection between a hose and coaxial line section is provided. The method includes providing an outer pipe, inserting an inner pipe along with a hose situated at least partially on an outer periphery of the inner pipe inside the outer pipe, and deforming the outer pipe, the inner pipe or both so that the hose becomes clamped between the inner pipe and outer pipe. A coaxial line section for a refrigerant circuit of a motor vehicle also is provided.

9 Claims, 4 Drawing Sheets

SOLDERLESS HOSE CONNECTION FOR A LINE SECTION OF AN AIR CONDITIONING SYSTEM

CROSS-REFERENCE TO RELATED APPLICATION

This application claims priority to German Patent Application No. 10 2012 002 994.2, filed Feb. 15, 2012, which is incorporated herein by reference in its entirety.

TECHNICAL FIELD

The technical field relates to a coaxial line section for an air conditioning system of a motor vehicle, as well as to a method for manufacturing a coaxial line section.

BACKGROUND

A connection device is known from DE 10 2007 042 841 A1. The connection device disclosed therein encompasses at least one coaxial pipe with an inner and outer area or arrangement with at least one inner pipe and one outer pipe, wherein there is a communicating connection between one end of the coaxial pipe or pipe arrangement and a connecting piece, wherein the connecting piece exhibits at least one first and one second terminal each having an opening, wherein the opening of the first and/or second terminal establishes a communicating connection between a hose and the connecting piece. The hose can here be positively crimped with the connecting piece.

Accordingly, it is desirable to provide a coaxial line section for a refrigerant circuit of a motor vehicle and a method for manufacturing the coaxial line section, which makes it possible to do without a connecting piece between an outer pipe and inner pipe on a hose connection. In addition, other objects, desirable features and characteristics will become apparent from the subsequent summary and detailed description, and the appended claims, taken in conjunction with the accompanying drawings and this background.

SUMMARY

In accordance with an exemplary embodiment, a method for manufacturing a connection between a hose and a coaxial line section exhibits the following steps:
a) Provision of an outer pipe,
b) Insertion of an inner pipe along with a hose situated at least partially on the outer periphery of the inner pipe inside the outer pipe, and
c) Deformation of at least one of the pipes, so that the hose becomes clamped between the inner pipe and outer pipe.

This method yields a connection between a coaxial line section and a hose, by which the hose can be directly joined to the outer pipe and inner pipe without an additional element. At the same time, the outer pipe can be sealed fluid-tight at the end by the constriction around the hose. The hose can here be arranged on a section of the outer pipe that is provided with an expansion. The constriction of the outer pipe around the hose at the end section can be created in a crimping process. As a consequence, the hose itself serves as a seal between the outer pipe and inner pipe. At the same time, the pipe is connected with the hose so as to be able to carry a fluid.

One embodiment provides the outer pipe with an expansion having an inner diameter, wherein the inner diameter is large enough to accommodate the hose.

The expansion can be generated in an additional procedural step, or already be provided on the pipe. For example, the expansion can be created by a mandrel penetrating into the outer pipe. The inner pipe with hose situated thereupon is inserted into the expansion in such a way that the hose projects a ways into the expansion, and can thus be encircled during outer pipe constriction or during expansion. The outer pipe is then deformed in the expansion area, thereby clamping the hose.

In another embodiment, a connection point for a junction is provided in the expansion between the hose and an unexpanded area of the outer pipe.

The connection point for the junction can here be formed by a borehole that penetrates through the expansion, as well as a soldered-on or welded-on line section. In the junction, a liquid flowing between the outer pipe and inner pipe, for example the refrigerant of an air conditioning system, can be introduced into the outer tube or discharged from the outer tube. An enlarged space created by the expansion serves as a collection point for the refrigerant during operation.

In an advantageous further embodiment, a fluting is provided on the outer periphery of the inner pipe.

As the outer pipe constricts, the hose material is compressed and elastically pressed into the fluting on the inner pipe. The fluting improves the tightness of the connection between the inner pipe and the hose.

In addition, in a further embodiment of the method, the outer pipe is provided with a fluting. The fluting for example is provided in the area of contact with the hose, and improves the tightness of the hose connection in the manner described above.

In an embodiment, the method further includes providing the interior side of the outer pipe with ribs. The ribs can here extend in the outer pipe up to a section in which the expansion is provided. The ribs can be provided by machining the interior side of a correspondingly thick-walled outer pipe in such a way as to produce ribs, for example by milling, stamping or rolling out free spaces. The ribs can also be fabricated in an extrusion process, in which a metal semi-finished part is pressed under a high pressure through a mask exhibiting the later cross section of the outer pipe, wherein the ribs extend inwardly from a ring section on the outer periphery. The expansion preferably does not incorporate any ribs, which can be milled out on the end given an outer pipe fabricated in an extrusion process.

Of course, the outer periphery of the inner pipe can also be provided with ribs, so as to improve heat transfer.

In another advantageous embodiment of the method, a sealing element is arranged between the inner pipe and hose. The sealing element can consist of a flexible material, and improve the seal between the inner pipe and hose. Two sealing elements are preferably situated axially parallel relative to each other in an area encircled by the constricted section of the outer pipe.

The method yields a coaxial line section, with an outer pipe and an inner pipe, as well as a hose clamped fluid-tight between the outer pipe and inner pipe in an end area. The coaxial line section is used in the refrigeration circuit of a motor vehicle. The inner pipe is joined in a fluid-carrying manner with a carburetor. The outer pipe is joined on one side with an expansion valve in a fluid-carrying manner, and joined by way of a junction with a capacitor in a fluid-carrying manner. The hose is joined with a compressor in a fluid-carrying manner.

Such an arrangement makes it possible to improve the efficiency of a refrigeration circuit, since the refrigerant in a gaseous, heated aggregate state can release heat to the liquid phase that prevails in front of the carburetor. In addition, a collection tank can be situated between the junction and capacitor for collecting and drying the refrigerant.

BRIEF DESCRIPTION OF THE DRAWINGS

The various embodiments will hereinafter be described in conjunction with the following drawing figures, wherein like numerals denote like elements, and wherein:

FIG. 2 b) is a cross-sectional view of an outer pipe that regionally exhibits an expansion, in accordance with an exemplary embodiment;

FIG. 2 c) is a cross-sectional view of an outer pipe that incorporates an inner pipe, as well as a hose arranged at the end on the inner pipe and slipped onto the inner pipe, in accordance with an exemplary embodiment;

FIG. 2d) is a cross-sectional view of a connection between a hose and a coaxial line section, in which a constriction positively and non-positively envelops the hose, in accordance with an exemplary embodiment;

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Identical or similar components on the figures are provided with the same reference number.

Figure 1:
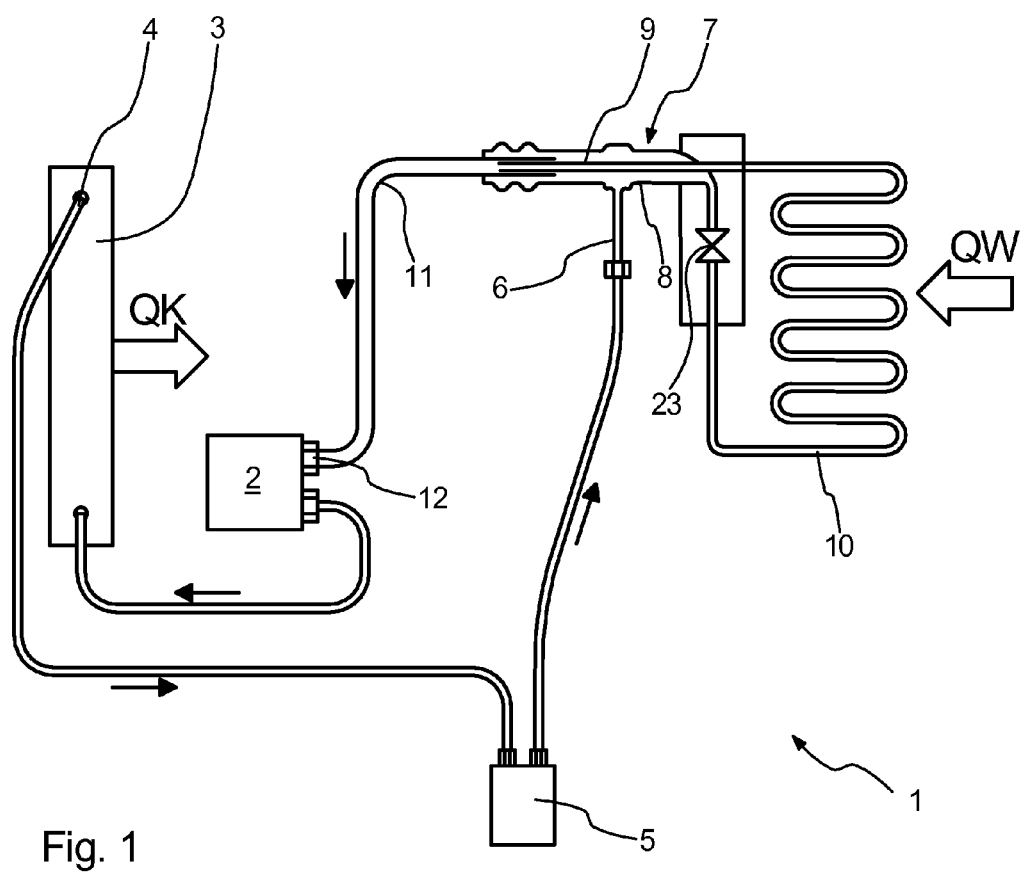
FIG. 1 schematically depicts a refrigeration circuit, which exhibits a hose arranged in a coaxial line section.

FIG. 1 schematically depicts a refrigerant circuit 1 for arrangement in a motor vehicle (not shown). A refrigerant circulates in the refrigerant circuit 1, so that a heat flow QW can be absorbed from an internal space, and a heat flow QK can be released to the environment. The refrigerant is compressed in a gaseous state in a compressor 2. The compressor 2 can be driven in a manner not depicted, for example by means of an endless belt coupled with an internal combustion engine. While the refrigerant is being compressed in the compressor 2, the pressure of the refrigerant increases, and the refrigerant becomes warm in the process. The heat can be released to the environment via the heat flow QK in a capacitor 3. In the capacitor 3, the refrigerant is liquefied during release of the heat flow QK. An output 4 of the capacitor 3 is joined in a fluid-carrying manner with an input of a collection tank 5. The refrigerant can accumulate in the collection tank 5 until it gets into a coaxial line section 7 by way of a connection 6. The coaxial line section 7 exhibits an outer pipe 8 and an inner pipe 9 arranged therein. The liquid refrigerant flows through the junction 6 and thereby gets into the outer pipe 8, before it is expanded at an expansion valve 23. During expansion at the expansion valve 23, the refrigerant cools, so that it can absorb a heat flow QW from the vehicle interior. The heat flow QW is here absorbed at a carburetor 10. After passing the carburetor 10, the refrigerant is present in an essentially gaseous phase. It enters into a hose 11 through the inner pipe 9. The hose 11 is joined with a suction side 12 of the compressor 2. In the outer pipe 8, the refrigerant releases heat to the cooled and gaseous refrigerant flowing through the inner pipe 9. The efficiency of the refrigerant circuit 1 can be improved by bringing together the otherwise separate line sections before the expansion valve 23 and after the carburetor 10.

Figure 2:
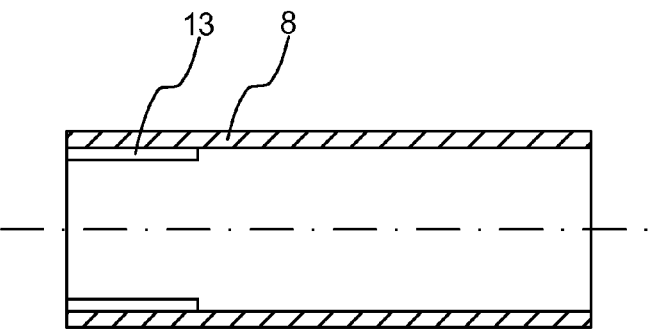
FIG. 2 a) is a cross-sectional view an outer pipe before a deformation process in accordance with an exemplary embodiment.
Figure 2:
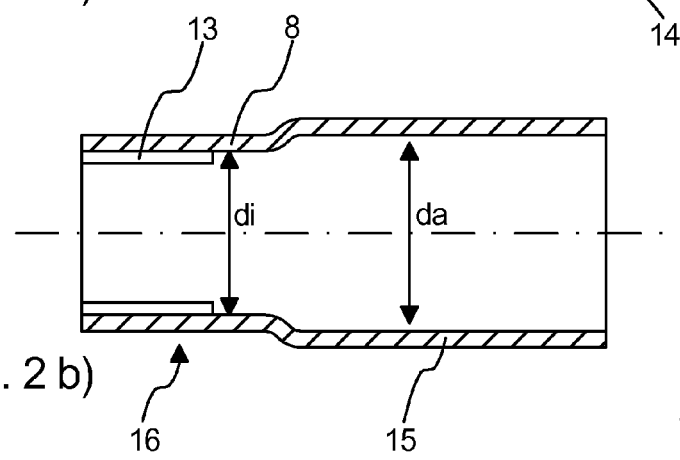
Figure 2:
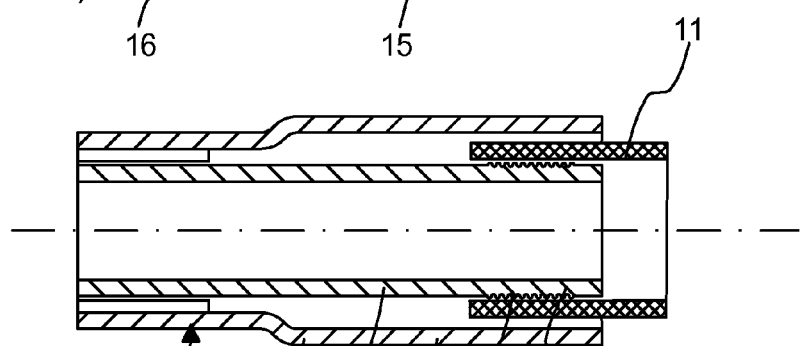
Figure 2:
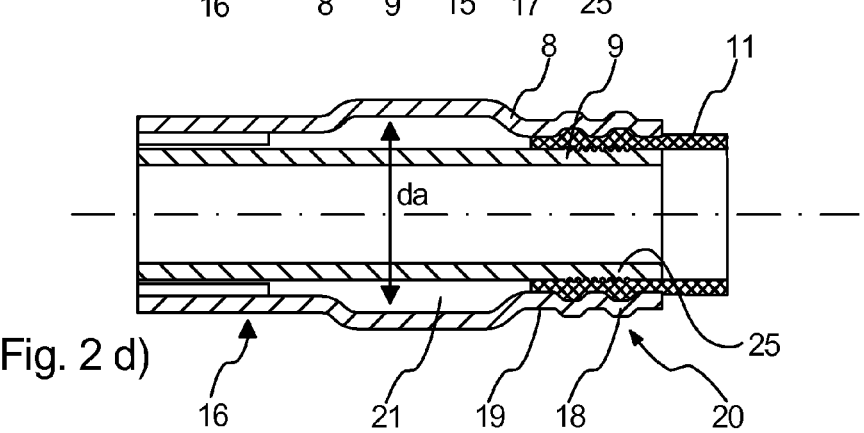

FIG. 2 a) shows the outer pipe 8 before a first procedural step, which provides for expanding the outer pipe 8. The outer pipe 8 can be expanded by means of a mandrel or in an internal high pressure forming process. The outer pipe 8 incorporates ribs 13, which improve the release of heat to the outer pipe 8, and extend roughly up until a section 14 in which the outer pipe 8 is later expanded. The outer pipe 8 can be manufactured in an extrusion process. The ribs 13 can here be fabricated at the same time. In the section 14 incorporating the expansion, the ribs 13 can be ground out in a milling process.

FIG. 2 b) shows the outer pipe 8 with an expansion 15. In the expansion 15, an inner diameter "da" of the outer pipe 8 is enlarged in relation to an inner diameter "di" of the outer pipe in the unexpanded section 16.

FIG. 2 c) shows an exemplary embodiment of a third procedural step, in which the inner pipe 9 is inserted into the outer pipe 8. A hose 11 is slipped onto an end section 25 of the inner pipe 9.

The hose 11 here extends a bit into the expansion 15. The outer periphery of the inner pipe 9 is provided with a fluting 17, which ensures a fluid-tight fit of the hose 11 on the inner pipe 9. The fluting 17 can here consist of continuous grooves and elevations. The hose 11 is made out of an elastic material, for example crude or vulcanized rubber. If necessary, the hose 11 can be fiber-reinforced.

FIG. 2 d) shows a state that arises after the expansion 15 has been constricted in the area of a constriction 20 around the hose 11, in accordance with an embodiment. As a result, the hose 11 is clamped between the outer pipe 8 and inner pipe 9. The constriction 20 can be established in a crimping process. In the area outside of elevations 18, valleys 19 are formed via a correspondingly magnified contact pressure, which acts radially inward. The interaction between the valleys 19 and elevations 18 causes the hose 11 to be positively held against the outer pipe 8. This seals the area inside the outer pipe 8 fluid-tight in relation to the environment. At the same time, the hose 11 is pressed against the inner pipe 9 strongly enough to also ensure a fluid-tight connection between the inner pipe 9 and hose 11. In an area between the unexpanded area 16 and constriction 20, the outer pipe 9 continues to exhibit an enlarged inner diameter "da", which serves as a collection point 21 for refrigerant.

Figure 3:
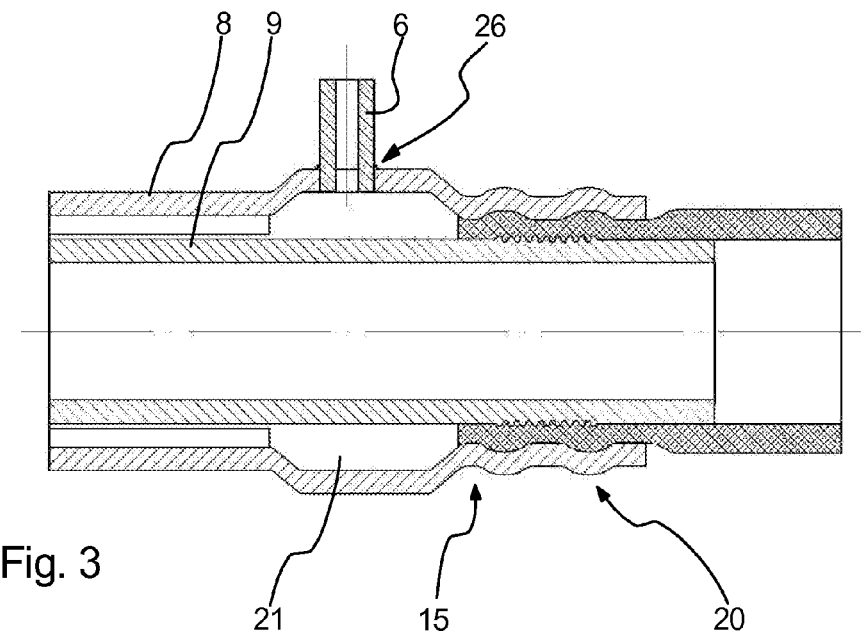
FIG. 3 is a cross-sectional view of the arrangement of FIG. 2 with a junction that empties into a collection point at a connection point, in accordance with an exemplary embodiment.

FIG. 3 shows the described arrangement with a junction 6 that empties into the collection point 21 at a connection point 26, and can be attached to the expansion 15 after the step described in conjunction with FIG. 2 d). The junction 6 leads from the collection tank 5 into the coaxial line section 7 (see FIG. 1). Liquid refrigerant here flows in the described manner, and releases its heat to the inner pipe 9, which is cooled by the cold, gaseous refrigerant. The oppositely changing temperature gradients as the flow passes through the coaxial line section 7 here yields good heat transfer characteristics.

Figure 4:
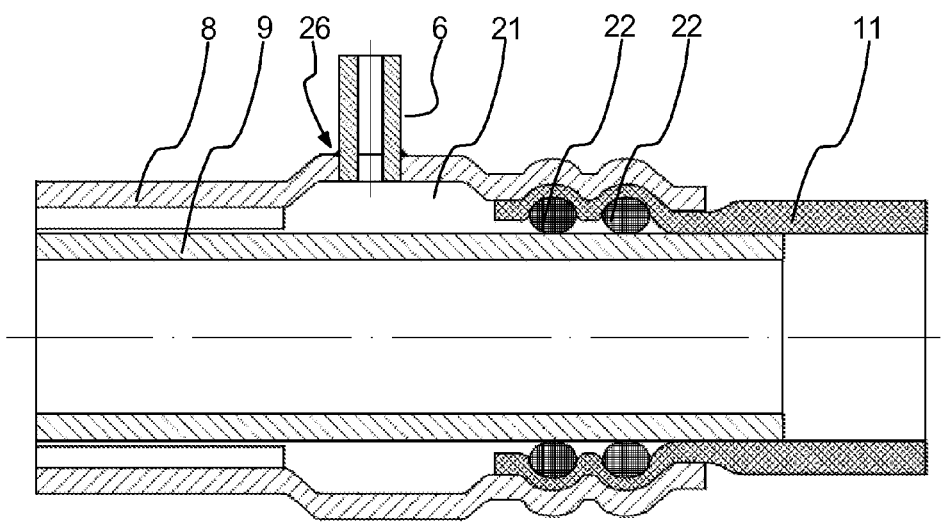
FIG. 4 is a cross-sectional view of a coaxial line section in which sealing elements are arranged between the inner pipe and hose.

FIG. 4 shows a coaxial line section 7, in accordance with another embodiment, in which the inner pipe 9 and hose 11 have arranged between them sealing elements 22 that improve the fluid-tight seal of the hose 11 in relation to the environment and collection area 21. The sealing elements 22 can be situated between the inner pipe 9 and hose 11 before establishing the constriction 20. In this case, the steps described in conjunction with FIGS. 2 c) and 2 d) must be enhanced by the step of introducing the sealing elements 22.

Figure 5:
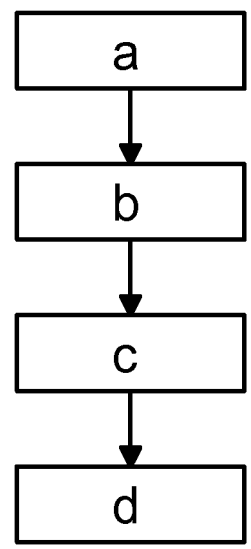
FIG. 5 schematically depicts a procedural sequence for manufacturing a hose arrangement on a coaxial line section.

FIG. 5 schematically depicts a procedural sequence for manufacturing a connection between a hose 11 and coaxial line section 7, which consists of an inner pipe 9 and outer pipe 8. Step a encompasses the preparation of an outer pipe, step b encompasses the creation of an expansion on the outer pipe, step c encompasses the insertion of an inner pipe 9 as well as a hose 11 slipped onto the inner pipe 9 into the expansion 15, and step d encompasses the creation of a constriction 20 on the outer pipe 8 in the area of an end section 25, so that the hose 11 becomes clamped between the inner pipe 9 and outer pipe 8.

Figure 6:
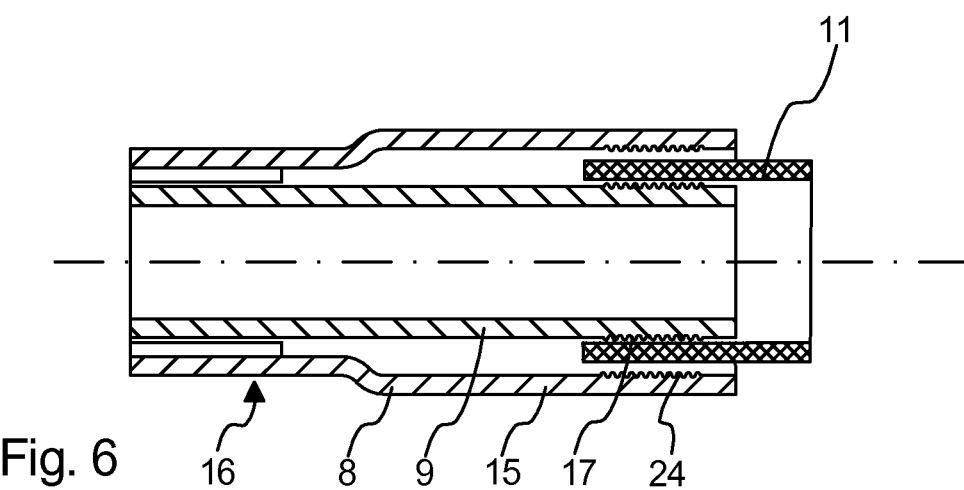
FIG. 6 is a cross-sectional view of an embodiment for an outer pipe with fluting.

FIG. 6 shows a connection in its state in step c), in which a fluting 24 is provided inside on the outer pipe 8 to go along with the fluting 17 on the inner pipe 9.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for manufacturing a connection between a hose and coaxial line section for a refrigerant circuit of a motor vehicle, the method comprising the steps of:
   providing an outer pipe with an inner surface and an outer surface, wherein the outer pipe is manufactured in an extrusion process;
   inserting an inner pipe with an inner surface and an outer surface along with the hose situated at least partially on the outer surface of the inner pipe inside the outer pipe; and
   deforming the outer pipe, the inner pipe or both so that the hose becomes clamped between the inner pipe and the outer pipe,
   wherein the inner surface of the inner pipe defines a first flow path configured to circulate a refrigerant as a gas, and
   wherein the outer surface of the inner pipe and the inner surface of the outer pipe define a second flow path coaxial to the first flow path and configured to circulate the refrigerant as a liquid such that, during operation, heat is transferred between the refrigerant in the first flow path and the refrigerant in the second flow path.

2. The method according to claim 1, wherein an expansion having an inner diameter is provided in the outer pipe, and wherein the inner diameter is large enough to accommodate the hose.

3. The method according to claim 2, wherein a connection point for a junction is provided in the expansion between the hose and an unexpanded area of the outer pipe.

4. The method according to claim 1, further comprising:
   providing a fluting on the outer surface of the inner pipe in an area of the connection with the hose.

5. The method according to claim 1, further comprising:
   providing an interior fluting in the outer pipe in an area of the connection with the hose.

6. The method according to claim 1, wherein ribs are provided in the outer pipe.

7. The method of claim 1, wherein the outer pipe is configured to provide the refrigerant to a carburetor and the inner pipe and the hose are configured to receive the refrigerant from the carburetor.

8. The method of claim 1, wherein the outer pipe further defines an unexpanded portion and an expanded portion,
   wherein the inserting step includes inserting the inner pipe along with the hose at least partially within the expanded portion of the outer pipe,
   wherein the deforming step includes deforming the outer pipe, the inner pipe, or both such that the second flow path is at least partially defined by the clamped hose between the inner pipe and the outer pipe; and
   wherein the method further comprises providing a connection point for a junction in the outer pipe at the expanded portion between the clamped hose and the unexpanded portion.

9. A coaxial line section for a refrigerant circuit of a motor vehicle, the coaxial line section comprising:
   an outer pipe joined on one side with an expansion valve in a fluid-carrying manner and joined by way of a junction with a condenser in a fluid-carping manner, wherein the outer pipe has an inner surface and an outer surface and is manufactured in an extrusion process;
   an inner pipe joined in a fluid-carrying manner with a carburetor, the inner pipe having an inner surface and an outer surface;
   a hose clamped fluid-tight between the outer pipe and the inner pipe in an end area by inserting the inner pipe along with the hose situated at least partially on the outer surface of the inner pipe into the outer pipe and deforming the outer pipe, the inner pipe or both so that the hose becomes clamped between the inner pipe and the outer pipe,
   wherein the hose is joined with a compressor in a fluid-carrying manner,
   wherein the inner surface of the inner pipe defines a first flow path configured to circulate a refrigerant as a gas, and
   wherein the outer surface of the inner pipe and the inner surface of the outer pipe define a second flow path coaxial to the first flow path and configured to circulate the refrigerant as a liquid such that, during operation, heat is transferred between the refrigerant in the first flow path and the refrigerant in the second flow path.

* * * * *